United States Patent
Takeya

[11] Patent Number: 5,757,745
[45] Date of Patent: May 26, 1998

[54] FOCUS SERVO CONTROLLING METHOD AND APPARATUS

[75] Inventor: Noriyoshi Takeya, Tokorozawa, Japan

[73] Assignee: Pioneer Electronic Corporation, Tokyo, Japan

[21] Appl. No.: 725,554

[22] Filed: Oct. 3, 1996

[30] Foreign Application Priority Data

Oct. 5, 1995 [JP] Japan .................... 7-259095

[51] Int. Cl.$^6$ .......................................... B11B 7/00
[52] U.S. Cl. .................... 369/44.27; 369/58; 369/44.37
[58] Field of Search .................... 369/54, 58, 50, 369/44.25, 44.26, 44.28, 44.37, 44.38, 44.41, 44.27, 94, 109, 112, 124

[56] References Cited

FOREIGN PATENT DOCUMENTS

0610055A2  10/1994  European Pat. Off. .

*Primary Examiner*—Paul W. Huber
*Attorney, Agent, or Firm*—Finnegan, Henderson, Farabow, Garrett & Dunner, L.L.P.

[57] ABSTRACT

When reproducing record information from one of a plurality of optical record mediums of various types, which distances from external surfaces thereof to information record surfaces thereof recorded with the record information are different from each other, a focus servo controlling method carries out the focus servo control. The method is provided with the steps of: judging a type of an optical record medium to be reproduced; irradiating an information record surface of the optical record medium with a plurality of light beams to be focused on different positions on one optical axis; moving, so as to change a relative distance parallel to said one optical axis between an objective lens for prescribing focal points of the plurality of light beams respectively and the information record surface, the objective lens; receiving a plurality of reflection lights of the plurality of light beams reflected from the information record surface respectively, associated with a change of the relative distance; generating a plurality of focus error signals on the basis of each of the plurality of received reflection lights. The method is further provided with the step of extracting one of the generated focus error signals, which corresponds to the type of the optical record medium judged by the judging step.

10 Claims, 13 Drawing Sheets

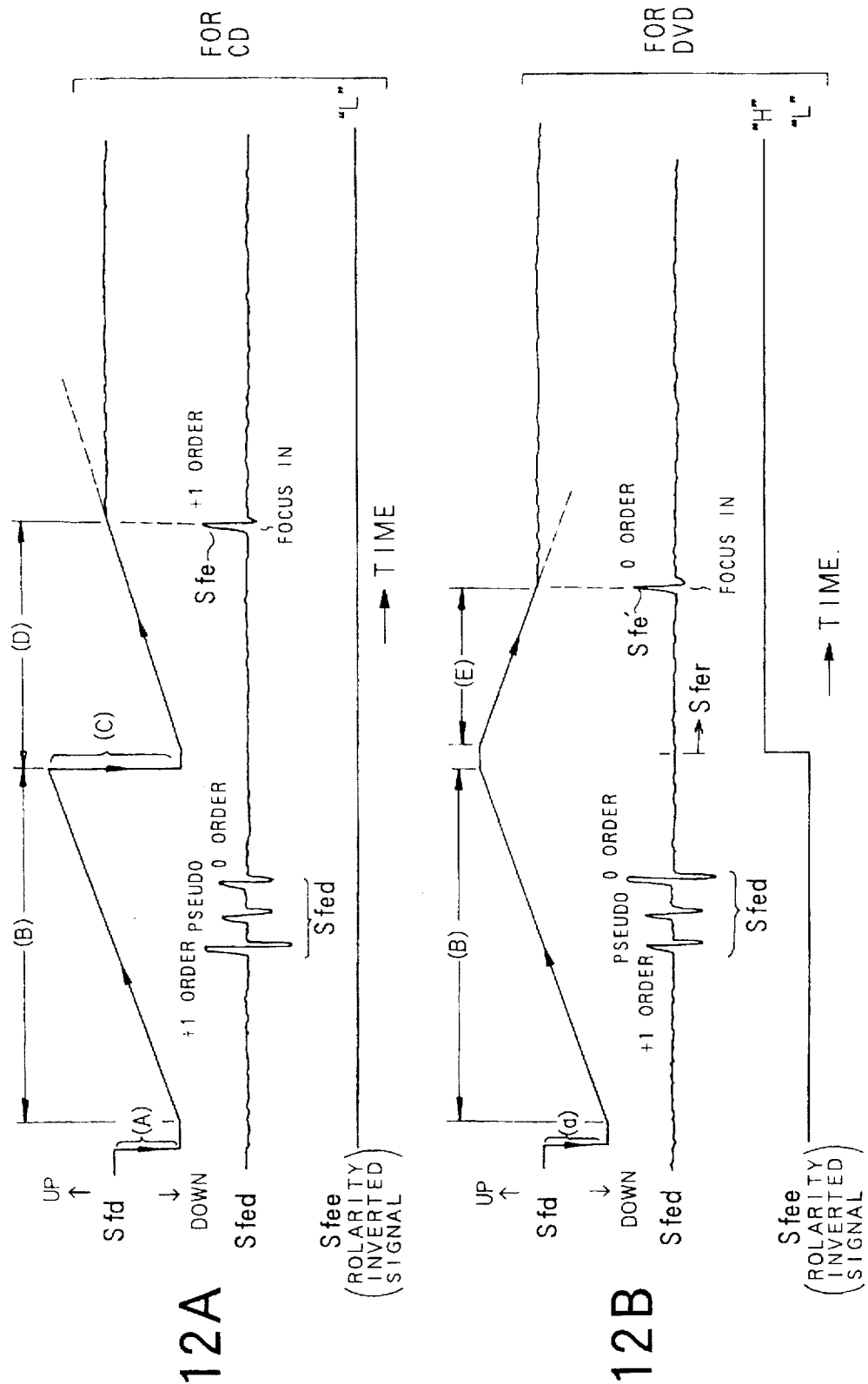

5,757,745

FOCUS SERVO CONTROLLING METHOD AND APPARATUS

BACKGROUND OF THE INVENTION

1. Field of the Invention

The present invention is related with a focus servo controlling method and apparatus for carrying out a focus servo control in order to beam-condense (focus) a light beam to an optimal size at a reproducing position of an information record medium, in an optical pickup for irradiating, to an information record medium such as an optical disk and the like to which information is recorded by a phase pit and the like or a magnetic way, the light beam as an information reproducing light to thereby reproduce the information by means of the reflected light.

2. Description of the Related Art

There is a so-called CD/LD compatible reproducing apparatus which can reproduce a CD (Compact Disk) and a LD (Laser Disk) with one reproducing unit. In this CD/LD compatible reproducing apparatus, a distance from a record medium surface to an information record surface (namely, a thickness of a protecting layer) is common in the CD and the LD (e.g. 1.2 mm in common). Thus, it is possible to reproduce both of these optical disks by using an optical pickup in which a light beam is condensed to one focal point.

On the other hand, a DVD (Digital Video Disk) is being developed which greatly improves a memory capacity as compared with a conventional CD and is a high density record medium to which one movie or the like can be recorded. Especially, a CD/DVD compatible reproducing apparatus is being developed which can reproduce both the DVD and the CD.

When comparing a configuration of the CD with that of the DVD, from the viewpoint of a high density request, the thickness of the protecting layer of the DVD is set to a thickness (0.6 mm) approximately half of that of the protecting layer of the CD. Thus, if trying to reproduce both of these optical disks by using the optical pickup having one focal point, for example, if trying to condense a light beam so as to be optimal for the DVD, since the protecting layer of the CD through which the light beam is passed is thicker than that of the DVD, aberration such as spherical aberration and the like is generated in the light beam. This results in a problem that the light beam can not be optimally condensed with respect to the CD.

In order to solve this problem, one method may be considered in which an aberration correcting element is inserted into an optical path of the light beam, depending on the type of the optical disk to be reproduced. However, this method requires a mechanical device which puts and retracts the aberration correcting element into and from the optical path on the basis of the type of the optical disk to be reproduced. Thus, this method is not suited for miniaturization of the optical pickup.

A bifocal lens is developed through which it is possible to irradiate two light beams focusing on different positions on one straight line. This bifocal lens is explained with reference to FIGS. 13A and 13B.

As shown in FIG. 13A, the bifocal lens comprises a diffraction grating H and an objective lens R arranged on one optical path. A light beam L made into a parallel light by a collimator lens C is divided into three beams of a 0 order light, a +1 order light and a −1 order light by the diffraction grating H. By using a difference between optical path lengths of the 0 order light and the +1 order light among them, the 0 order light and the +1 order light are made focused on different positions on one straight line. More actually, this bifocal lens is adapted such that the +1 order light is focused on a position further from the objective lens R than the 0 order light, and that the 0 order light is optimally beam-condensed on the information record surface of the DVD (e.g. 0.6 mm from the disk surface), and also as shown in FIG. 13B, the +1 order light is optimally beam-condensed on the information record surface of the CD (e.g. 1.2 mm from the disk surface).

If using this bifocal lens, it is possible to use one optical pickup to thereby reproduce both of the CD and the DVD.

Even in a case of using the above mentioned bifocal lens to thereby reproduce information, similarly to the conventional cases, a focus servo control is required in order to carry out an optimal focus servo control corresponding to the type of the optical disk to be reproduced. In this case, for example, in order to use a conventionally general astigmatism method to thereby carry out a focus servo control, it is necessary to carry out a so-called focus search action for setting a standard position to perform the focus servo control before actually performing the focus servo control. This focus search action moves the optical pickup in a direction perpendicular to the optical disk by a predetermined length to thereby detect an optimal focus position on the basis of a focus error signal (S-shaped signal) outputted at that time.

However, if using the bifocal lens to thereby carry out the focus search action, a plurality of light beams are focused on different positions, which causes a plurality of focus error signals to be detected. More actually, at least three focus error signals i.e. a focus error signal due to a reflection light of the 0 order light, a focus error signal due to a reflection light of the +1 order light and a pseudo focus error signal resulting from a fact that the reflection light from the optical disk of the +1 order light is passed through the optical path of the 0 order light, are detected at a predetermined time difference associated with a moving action of the optical pickup. As a result, it is impossible to judge or identify the focus error signal corresponding to the optical disk to be reproduced. This results in a serious problem that it is impossible to carry out the focus search action which is optimal for the reproduced optical disk.

Further, in a case of using a conventional focus servo controlling apparatus which is capable of processing only one focus error signal, a plurality of focus error signals are outputted. This results in a problem that a stable focus search action can not be carried out.

SUMMARY OF THE INVENTION

It is therefore an object of the present invention to provide a focus servo controlling method and apparatus, which can carry out an optimal focus search action corresponding to the type of an optical disk to be reproduced so as to carry out a correct focus servo control, on the basis of a focus error signal corresponding to the optical disk.

It is another object of the present invention to provided a focus servo controlling apparatus and method, which can carry out a stable focus servo control even in a case that the focus servo controlling apparatus is capable of processing only one focus error signal.

The above object of the present invention can be achieved by a focus servo controlling method for carrying out a focus servo control when reproducing record information from one of a plurality of optical record mediums of various types, which distances from external surfaces thereof to information record surfaces thereof recorded with the record information are different from each other. The focus servo controlling method is provided with the steps of: judging a type of an optical record medium to be reproduced; irradiating an information record surface of the optical record medium with a plurality of light beams to be focused on different positions on one optical axis; moving, so as to change a relative distance parallel to said one optical axis between an objective lens for prescribing focal points of the plurality of light beams respectively and the information record surface, the objective lens; receiving a plurality of reflection lights of the plurality of light beams reflected from the information record surface respectively, associated with a change of the relative distance; generating a plurality of focus error signals on the basis of each of the plurality of received reflection lights; extracting one of the generated focus error signals, which corresponds to the type of the optical record medium judged by the judging step; and carrying out the focus servo control on the basis of the extracted focus error signal.

According to the focus servo controlling method of the present invention, the type of the optical record medium to be reproduced is judged. The information record surface of the optical record medium is irradiated with a plurality of light beams to be focused on different positions on one optical axis. Then, the objective lens is moved, so that the relative distance parallel to said one optical axis between an objective lens for prescribing focal points of the plurality of light beams respectively and the information record surface is changed. Then, a plurality of reflection lights of the plurality of light beams reflected from the information record surface respectively, associated with a change of the relative distance, is received. Then, on the basis of each of the plurality of received reflection lights, a plurality of focus error signals is generated. Then, one of the generated focus error signals, is extracted, which corresponds to the type of the optical record medium judged by the judging step. Finally, on the basis of the extracted focus error signal, the focus servo control is carried out.

Accordingly, the focus servo control is not erroneously performed by the focus error signal which does not correspond to the type of the information record medium to be reproduced, and thereby it is possible to carry out the correct focus servo control regardless of the types of optical record mediums. Further, since only one focus error signal corresponding to the appropriate type of the optical record medium is extracted, even for the optical pickup in which a plurality of focus error signals are generated, it is possible to use the focus servo device having a capability of processing only one focus error signal.

As one aspect of the focus servo controlling method of the present invention, the extracting step has the step of replacing a focus error signal other than the focus error signal, which corresponds to the type of the optical record medium judged by the judging step, by a replacement signal having a predetermined constant voltage.

According to this aspect, since the focus error signal or signals other than the focus error signal corresponding to the judged type of the optical record medium is replaced by the replacement signal, it is possible to extract the appropriate focus error signal more accurately.

As another aspect of the focus servo controlling method of the present invention, the extracting step has the steps of: counting the generated focus error signals; and extracting one of the counted focus error signals, which corresponds to a count value set on the basis of the type of the optical record medium judged by the judging step.

According to this aspect, since the focus error signal corresponding to the count value set on the basis of the judged type of the optical record medium is extracted, the above mentioned replacement signal having the constant voltage and the like is not necessary, so that the extracting step can be made simplified.

As another aspect of the focus servo controlling method of the present invention, the extracting step has the steps of: inverting a moving direction of the objective lens in the moving step on the basis of the type of the optical record medium judged by the judging step; and extracting a focus error signal, which is firstly generated by the generating step in conjunction with a moving action of the objective lens in the inverted moving direction.

According to this aspect, since the moving direction of the objective lens is inverted and the firstly generated focus error signal is simply extracted, the above mentioned counting step or the above mentioned replacement signal is not necessary, so that the extracting step can be made simplified.

As another aspect of the focus servo controlling method of the present invention, the judging step has the steps of: pre-moving the objective lens prior to the focus servo control, and judging the type of the optical record medium by comparing levels of a plurality of focus error signals, which are generated by the generating step while pre-moving the objective lens, with a predetermined standard level.

According to this aspect, since the judging step can be performed by comparing the levels of a plurality of focus error signals with the predetermined standard level, the judging step and the moving step can be performed by use of the same means, so that the construction of the apparatus to perform the focus servo controlling method of the present invention can be made simplified as a whole.

The above object of the present invention can be also achieved by a focus servo controlling apparatus for carrying out a focus servo control when reproducing record information from one of a plurality of optical record mediums of various types, which distances from external surfaces thereof to information record surfaces thereof recorded with the record information are different from each other. The focus servo controlling apparatus is provided with: a judging device for judging a type of an optical record medium to be reproduced; an irradiating device for irradiating an information record surface of the optical record medium with a plurality of light beams to be focused on different positions on one optical axis; a moving device for moving, so as to change a relative distance parallel to said one optical axis between an objective lens for prescribing focal points of the plurality of light beams respectively and the information record surface, the objective lens; a light-receiving device for receiving a plurality of reflection lights of the plurality of light beams reflected from the information record surface respectively, associated with a change of the relative distance; a focus error signal generating device for generating a plurality of focus error signals on the basis of each of the plurality of received reflection lights; an extracting device for extracting one of the generated focus error signals, which corresponds to the type of the optical record medium judged by the judging device; and a controller for carrying out the focus servo control on the basis of the extracted focus error signal.

According to the focus servo controlling apparatus of the present invention, the type of the optical record medium to be reproduced is judged by the judging device. The information record surface of the optical record medium is irradiated with a plurality of light beams to be focused on different positions on one optical axis, by the irradiating device. Then, the objective lens is moved by the moving device, so that the relative distance parallel to said one optical axis between an objective lens for prescribing focal points of the plurality of light beams respectively and the information record surface is changed. Then, a plurality of reflection lights of the plurality of light beams reflected from the information record surface respectively, associated with a change of the relative distance, is received by the light-receiving device. Then, on the basis of each of the plurality of received reflection lights, a plurality of focus error signals is generated by the focus error signal generating device. Then, one of the generated focus error signals, is extracted by the extracting device, which corresponds to the type of the optical record medium judged by the judging step. Finally, on the basis of the extracted focus error signal, the focus servo control is carried out by the controller.

Accordingly, the focus servo control is not erroneously performed by the focus error signal which does not correspond to the type of the information record medium to be reproduced, and thereby it is possible to carry out the correct focus servo control regardless of the types of optical record mediums. Further, since only one focus error signal corresponding to the appropriate type of the optical record medium is extracted, even for the optical pickup in which a plurality of focus error signals are generated, it is possible to use, as the controller, the focus servo device having a capability of processing only one focus error signal.

As one aspect of the focus servo controlling apparatus of the present invention, the extracting device has a replacing device for replacing a focus error signal other than the focus error signal, which corresponds to the type of the optical record medium judged by the judging device, by a replacement signal having a predetermined constant voltage.

According to this aspect, since the focus error signal or signals other than the focus error signal corresponding to the judged type of the optical record medium is replaced by the replacement signal, it is possible by the extracting device to extract the appropriate focus error signal more accurately.

As another aspect of the focus servo controlling apparatus of the present invention, the extracting device has: a counter for counting the generated focus error signals; and an extractor for extracting one of the counted focus error signals, which corresponds to a count value set on the basis of the type of the optical record medium judged by the judging device.

According to this aspect, since the focus error signal corresponding to the count value set on the basis of the judged type of the optical record medium is extracted by the extracting device, the above mentioned replacement signal having the constant voltage and the like is not necessary, so that the construction of the extracting device can be made simplified.

As another aspect of the focus servo controlling apparatus of the present invention, the extracting device has: an inverting device for inverting a moving direction of the objective lens by the moving device on the basis of the type of the optical record medium judged by the judging device; and an extractor for extracting a focus error signal, which is firstly generated by the generating device in conjunction with a moving action of the objective lens in the inverted moving direction.

According to this aspect, since the moving direction of the objective lens is inverted and the firstly generated focus error signal is simply extracted by the extracting device, the above mentioned counter or the above mentioned replacement signal is not necessary, so that the construction of the extracting device can be made simplified.

As another aspect of the focus servo controlling apparatus of the present invention, the judging device has: a pre-moving device for pre-moving the objective lens prior to the focus servo control, and a comparing device for judging the type of the optical record medium by comparing levels of a plurality of focus error signals, which are generated by the generating device while pre-moving the objective lens, with a predetermined standard level.

According to this aspect, since the judgment can be performed by comparing the levels of a plurality of focus error signals with the predetermined standard level, the judging means and the moving means can be performed by use of the same means, so that the construction of the focus servo controlling apparatus as a whole can be made simplified.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 12A is a timing chart showing the operation of the reproducing apparatus for the CD according to the fourth embodiment;

FIG. 12B is a timing chart showing the operation of the reproducing apparatus for the DVD according to the fourth embodiment;

DESCRIPTION OF THE PREFERRED EMBODIMENTS

Next, preferred embodiments of the present invention will be explained with reference to the drawings.

(I) First Embodiment

The first embodiment is explained with reference to FIGS. 1 to 4.

At first, the configuration of the reproducing apparatus according to the first embodiment is explained with reference to FIG. 1.

Figure 1:
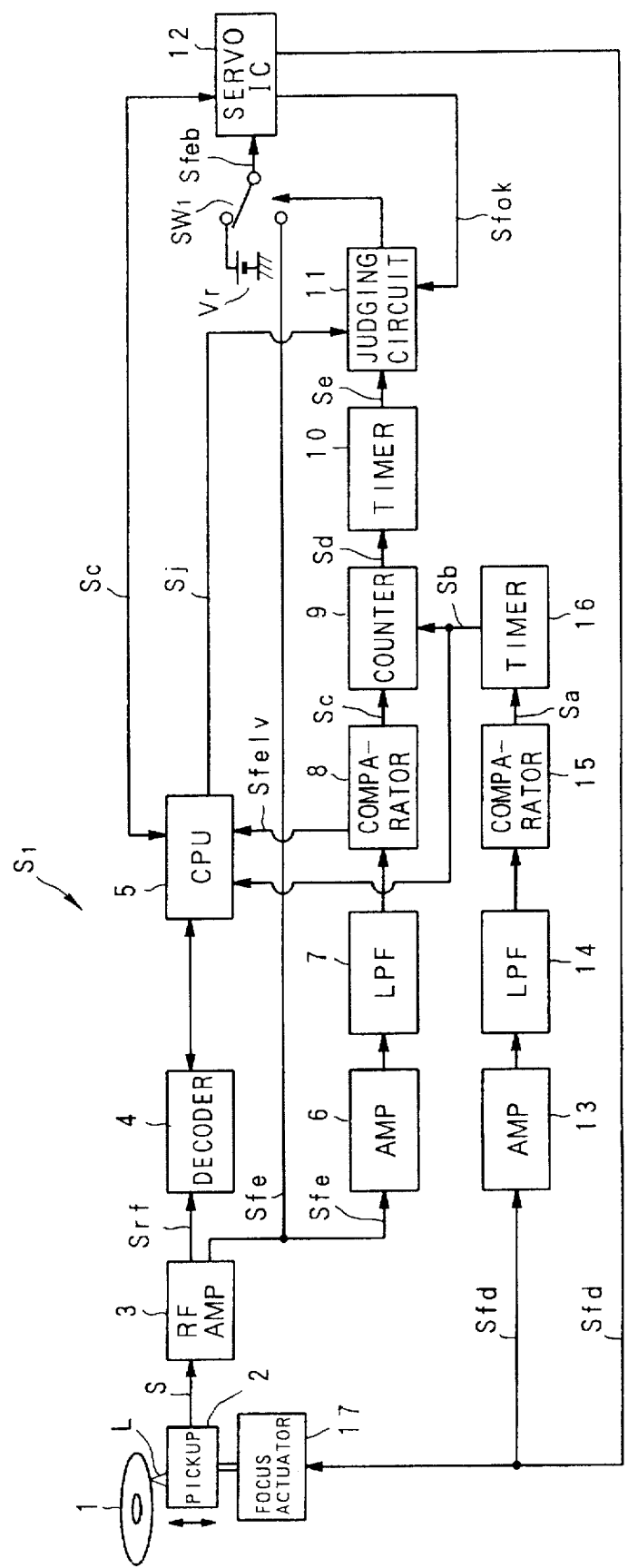
FIG. 1 is a block diagram showing a configuration of a reproducing apparatus according to a first embodiment.
Figure 13A:
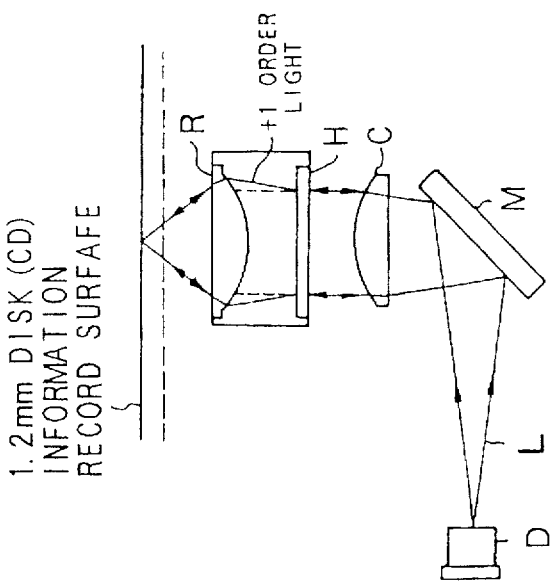
FIG. 13A is a block diagram showing a configuration of a bifocal lens in one operating status.
Figure 13B:
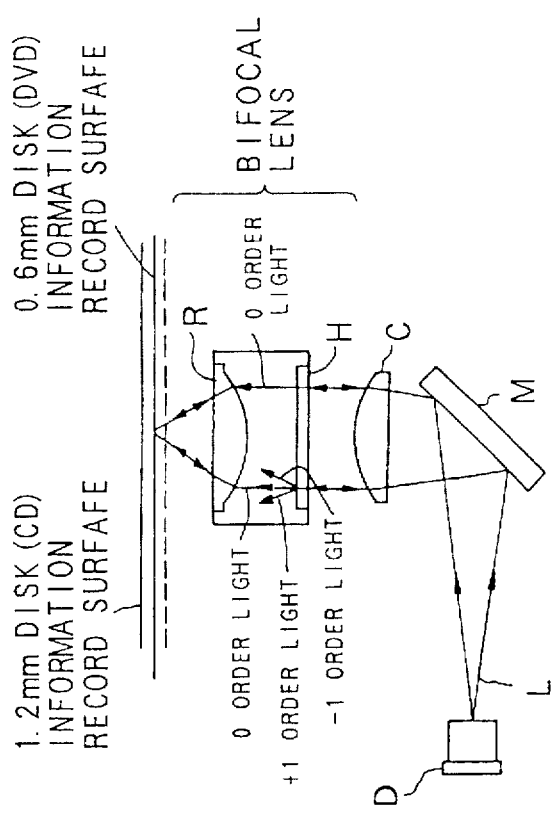
FIG. 13B is a block diagram showing a configuration of a bifocal lens in another operating status.

As shown in FIG. 1, a reproducing apparatus $S_1$ of the first embodiment is provided with an optical pickup 2, an RF (Radio Frequency) amplifier 3, a decoder 4, an amplifier 6, a LPF (Low Pass Filter) 7, a comparator 8, a counter 9, a timer 10, a judging circuit 11, a switch SW1, a servo IC (Integrated Circuit) 12, an amplifier 13, a LPF 14, a comparator 15, a timer 16, a focus actuator 17 and a CPU 5. The optical pickup 2 comprises the above mentioned bifocal lens shown in FIGS. 13A and 13B, a cylindrical lens for giving astigmatism to a reflection light from an optical disk 1, irradiates a plurality of light beams L to the optical disk 1 that is a CD or a DVD for example, also receives the reflection light of each of the light beams L from the optical disk 1, and converts the received reflection light into an electrical signal S to thereby output it. The RF amplifier 3, which is a focus error signal generating means, generates a focus error signal Sfe and an RF signal Srf from the electric signal S outputted from the optical pickup 2 and also amplifies them respectively. The decoder 4 decodes the amplified RF signal Srf to thereby generate an image signal and the like corresponding to recorded information, and outputs through the CPU 5 to a signal processing circuit (not shown). The amplifier 6 further amplifies the focus error signal Sfe. The LPF 7 removes a high frequency noise included in the amplified focus error signal Sfe. The comparator 8 compares the focus error signal Sfe, from which the high frequency noise is removed, with a predetermined comparison voltage to thereby output a comparison signal Sc and also outputs to the CPU 5 a level signal Sfelv indicating a level of the focus error signal Sfe. The counter 9 outputs a count signal Sd, on the basis of the comparison signal Sc and a timer signal Sb from the timer 16. The timer 10 outputs a replacement control signal Se for replacing the focus error signal Sfe by a predetermined standard voltage Vr as a replacement signal only for a predetermined time period, on the basis of the count signal Sd. The judging circuit 11 outputs a control signal for controlling the switch SW1, on the basis of the replacement control signal Se, a judgment signal Sj described later and a FOK (Focus OK) signal Sfok indicating that a focus servo described later is closed. The switch SW1, which is a replacing means, replaces the focus error signal Sfe inputted from the RF amplifier 3 by a standard voltage Vr having a constant voltage value for a predetermined time period, on the basis of the appropriate control signal, to thereby output a replacement focus error signal Sfeb. The servo IC 12, which is a controlling means, outputs a focus drive signal Sfd for controlling the focus actuator 17, on the basis of the replacement focus error signal Sfeb. The amplifier 13 amplifies the focus drive signal Sfd. The LPF 14 removes high frequency noise included in the amplified focus drive signal Sfd. The comparator 15 compares the focus drive signal Sfd, from which the high frequency noise is removed, with a predetermined comparison voltage to thereby output a comparison signal Sa. The timer 16 outputs a timer signal Sb having a constant voltage for the predetermined time period, on the basis of the comparison signal Sa. The focus actuator 17, which is a moving, inverting and pre-moving means, for driving the bifocal lens in a direction perpendicular to an information record surface on the optical disk 1, on the basis of the focus drive signal Sfd. The CPU 5, which is a judging means, sends and receives the control signal Sc to and from the Servo IC 12, and judges whether the optical disk 1 is the CD or the DVD on the basis of the level signal Sfelv to thereby output the judgment signal Sj and further controls the reproducing apparatus $S_1$ as a whole.

An operation of the reproducing apparatus $S_1$ is explained with reference to the flow chart shown in FIG. 2 and the timing chart shown in FIG. 3. In the timing chart in FIG. 3, a horizontal axis represents a time. In the focus drive signal Sfd, a plus direction (an upward direction in FIG. 3) represents a signal for moving up the bifocal lens, and a minus direction (a downward direction in FIG. 3) represents a signal for moving down the bifocal lens.

Figure 2:
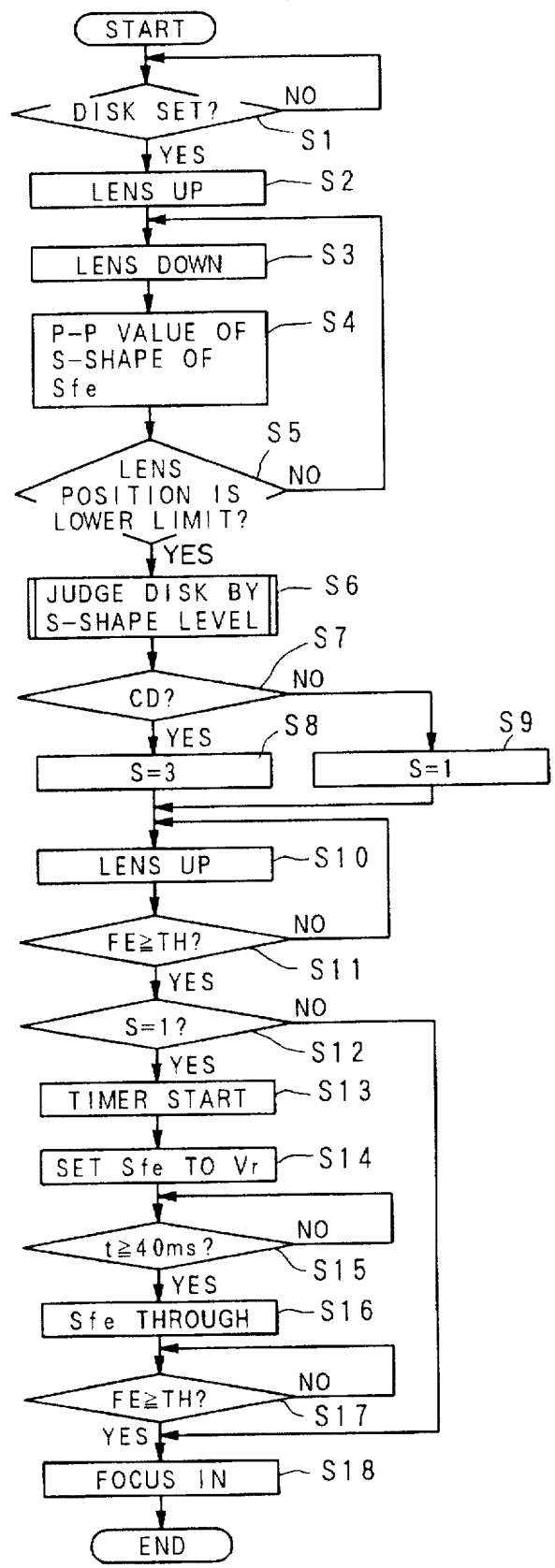
FIG. 2 is a flow chart showing an operation of the reproducing apparatus according to the first embodiment.

In FIG. 2, at first, it is detected whether or not the optical disk 1 is set in the reproducing apparatus $S_1$ by a detecting device that is not shown in FIG. 1 (Step S1). In a case that the it is not still set (Step S1 ; NO), the operation is waited as it is. In a case that it is set (Step S1 ; YES), the focus drive signal Sfd for moving up the bifocal lens is outputted from the servo IC 12 (refer to a symbol (A) of FIG. 3). Then, the bifocal lens is moved up to a predetermined position in a short time (step S2). The predetermined position in this case is defined as a position at which even if the optical disk 1 is either one of the CD or the DVD, both of two light beams L having different focus points cross the information record surface of the optical disk 1.

Figure 3:
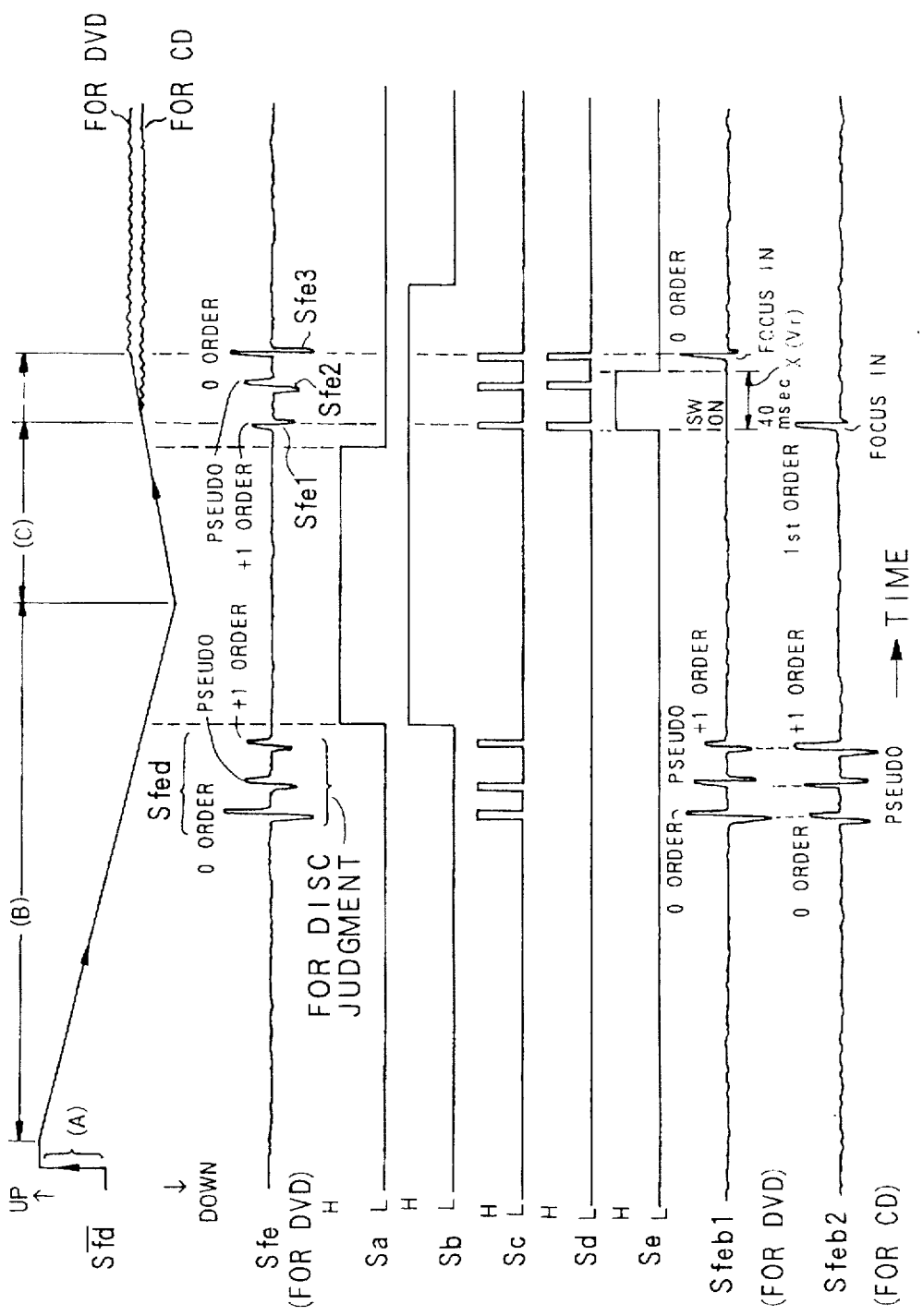
FIG. 3 is a timing chart showing the operation of the reproducing apparatus according to the first embodiment.

When the bifocal lens is moved up to the predetermined position (Step S2), the focus drive signal Sfd is outputted in order to move down the bifocal lens at a predetermined speed (Step S3, and refer to a symbol (B) of FIG. 3). Then, the focus error signal Sfe detected in the course of the moving down action is read sequentially (Step S4). More actually, the peak to peak value of the S-shape of the focus error signal is sequentially read. After that, it is judged whether or not a position of the bifocal lens that is moved down is a lower limit (Step S5). In a case that the position is not the lower limit (Step S5 ; NO), the operation is returned to the step S3 in order to continue the moving down action as it is. In a case that the position becomes the lower limit (Step S5 ; YES), on the basis of the three focus error signals Sfe (This is represented by a symbol Sfed in FIG. 3. The focus error signal Sfe in FIG. 3 corresponds to the focus error signal Sfe in a case that the optical disk 1 is the DVD) detected in the course of the moving down action until that time, it is judged whether or not the optical disk 1 is the CD or the DVD (Step S6). This optical disk judgment is explained in detail with reference to FIG. 4.

Figure 4A:
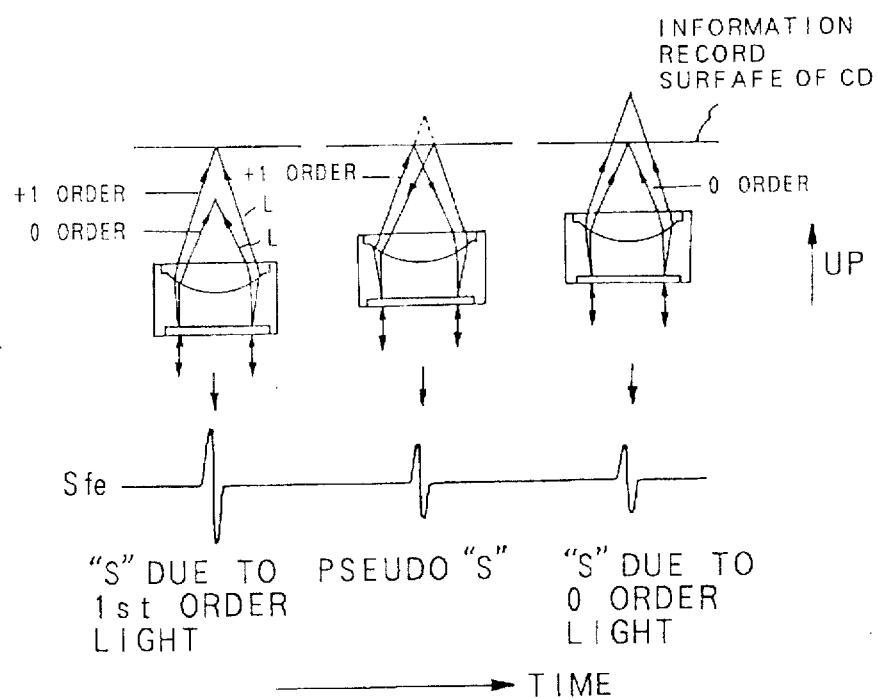
FIG. 4A is an operation diagram showing an operation for a disk judgment.

As described above, the two light beams L from the bifocal lens are set such that the +1 order light is optimally beam-condensed on the CD and the 0 order light is optimally beam-condensed on the DVD. The focal distance of the +1 order light is longer than that of the 0 order light. Thus, for example, as shown in FIG. 4A, when the bifocal lens is moved up for the CD, at first the +1 order light is focused on the information record surface of the CD, and the focus error signal Sfe is detected. Next, the above mentioned pseudo focus error signal Sfe is detected. Finally, the focus error signal Sfe corresponding to the 0 order light is detected. As mentioned above, the optical system is set such that the 0 order light is optimally beam-condensed for the DVD and the +1 order light is optimally beam-condensed for the CD. Thus, for a reverse combination, the optimal beam-condensed condition is not induced, for example, because of generation of spherical aberration and the like. Accordingly, in a case that the optical disk is the CD, the focus error signal Sfe corresponding to the +1 order light has the highest level, and the focus error signal Sfe corresponding to the 0 order light has the lowest level. In contrast with this, in a case that the optical disk is the DVD, the focus error signal Sfe corresponding to the 0 order light has the highest level, and the focus error signal Sfe corresponding to the +1 order light has the lowest level. As a result, it is possible to judge whether the optical disk is the CD or the DVD by detecting a high/low level relation between the focus error signal Sfe corresponding to the 0 order light and a predetermined threshold TH1. Here, for example, the threshold TH1 is set so as to be lower than a level (a symbol FE2 of FIG. 4B) of the focus error signal Sfe in a case that the 0 order light is beam-condensed to the DVD and higher than a level (a symbol FE1 of FIG. 4B) of the focus error signal Sfe in a case that the 0 order light is beam-condensed to the CD.

Figure 4B:
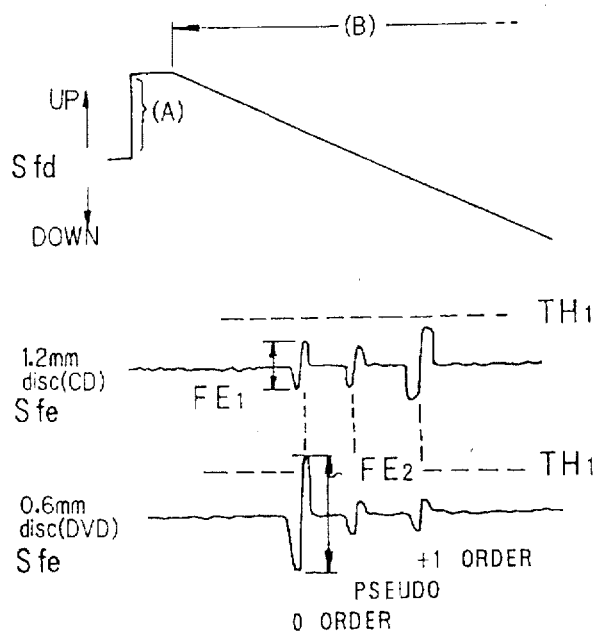
FIG. 4B is a wave form diagram corresponding to FIG. 4A.

More actually explaining by using FIG. 4B, in the bifocal lens in which the moving down action is started at the step S3 in FIG. 2, at first the 0 order light is focused (optimally beam-condensed) on the information record surface. After that, the +1 order light is focused (optimally beam-condensed). Thus, when comparing the level of the focus error signal Sfe detected firstly in the moving down process (the level of the focus error signal Sfe corresponding to the 0 order light) with the threshold TH1, if equal to or more than the threshold TH1, the optical disk 1 is judged as the DVD, and if less than the threshold TH1, the optical disk 1 is judged as the CD. This judgment is carried out by the CPU 5, on the basis of the level signal Sfelv outputted from the comparator 8. A result thereof is outputted to the judging circuit 11 as the judgment signal Sj.

In addition to the above mentioned method as the judging method, it is possible to judge by reading all the focus error signals Sfe (a symbol Sfed of FIG. 3) detected in the moving down process, detecting the levels respectively and judging which of the levels of the focus error signals Sfe is higher than the threshold TH1. This is explained as follows. That is, in the moving down process of the bifocal lens, it is known that at first the focus error signal Sfe corresponding to the 0 order light is detected and finally the focus error signal Sfe corresponding to the +1 order light is detected. Thus, if the level of the focus error signal Sfe corresponding to the 0 order light is higher, the optical disk is judged as the DVD. If the level of the focus error signal Sfe corresponding to the +1 order light is higher, the optical disk is judged as the CD.

According to the above mentioned method, the type of the optical disk 1 is judged by using the focus error signal Sfed (refer to FIG. 3) (Steps S6 and S7). If it is the CD (Step S7; YES), a parameter S is set to "3" (Step S8). If it is the DVD (Step S7; NO), the parameter S is set to "1" (Step S9).

In parallel to the steps S8 and S9, as shown in FIG. 3, the comparator 15 outputs, on the basis of the focus drive signal Sfd, the comparison signal Sa after the focus error signal Sfed is detected. This comparison signal Sa indicates a timing of starting a detecting action of the focus error signal Sfe1, when the bifocal lens is shifted from the moving down process to a moving up process, namely, when a driving direction is inverted, and maintains a "H" level while the focus drive signal Sfd is lower than a predetermined value. The timer 16 starts a clocking action on the basis of a rising edge of the comparison signal Sa, and clocks (measures) a time enough to detect the focus error signals Sfe1 to Sfe3 obtained after the driving direction of the bifocal lens is inverted, and outputs to the CPU 5 and the counter 9 the timer signal Sb, which maintains the "H" level for this period. On the other hand, the comparator 8 outputs to the counter 9 the corresponding comparison signal Sc on the basis of the focus error signal Sfe. While the steps S1 to S7 are carried out, the switch SW1 is kept on a side of the focus error signal Sfe. Thus, the replacement focus error signal Sfeb is a replacement focus error signal Sfeb1 (when the optical disk 1 is the DVD) shown in FIG. 3 or a replacement focus error signal Sfeb2 (when the optical disk 1 is the CD) shown in FIG. 3. At this time, the timer signal Sb is in a "L" level, which causes a focus servo loop of the servo IC 12 to be open on the basis of the control signal Sc from the CPU 5. As a result, a focus servo control is not carried out by the focus error signal Sfed.

When the parameter S is set to "1" or "3" (Steps S8 and S9), the focus drive signal Sfd is outputted for moving up the bifocal lens (Step S10, and refer to a symbol (C) of FIG. 3). When, the bifocal lens is moved up (Step S10), it is judged whether or not the first focus error signal Sfe1 (refer to a symbol Sfe1 of FIG. 3) is detected (Step S11). Namely, the level FE of the focus error signal Sfe1 is compared with the predetermined threshold value TH. In a case that the first focus error signal Sfe1 is not detected (Step S11; NO), the moving up action is continued until it is detected (Step S10). In a case that the focus error signal Sfe1 is detected (Step S11; YES), it is judged whether or not the parameter S is "1" (Step S12).

At the step S12, in a case of "1" (Step S12; YES), the optical disk 1 is the DVD. Thus, in order to carry out a focus-in action by use of the focus error signal (i.e. the focus error signal Sfe corresponding to the 0 order light) shown by a symbol Sfe3 in FIG. 3, the timer 10 is started at a timing when the focus error signal Sfe1 is detected (Step S13). The replacement control signal Se becomes in the "H" level on the basis of the count signal Sd. At this time, the comparison signal Sc is as shown in FIG. 3. Since the count signal Sd is outputted which is a logic sum of the comparison signal Sc and the timer signal Sb, the replacement control signal Sd becomes in the "H" level accurately at the timing when the focus error signal Sfe1 is detected. When the replacement control signal Sd becomes in the "H" level, a control signal for switching the switch SW1 from the side of the focus error signal Sfe to a side of the standard voltage Vr is outputted from the judging circuit 11. Then, the replacement focus error signal Sfeb is replaced by the standard voltage Vr (a 0 V level in a case shown in FIG. 3) for a predetermined time period (for example, 40 msec in a case of the first embodiment) as shown by a symbol X of FIG. 3 (Step S14). This predetermined time period is a time period until the focus error signals Sfe1 and Sfe2 (refer to FIG. 3) are detected, corresponding to a moving speed of the bifocal lens. Then, it is judged whether or not 40 msec has elapsed (Step S15). If it does not elapse (Step S15; NO), the operation is waited as it is. If 40 msec has elapsed (Step S15; YES), again the switch SW1 is switched to the side of the focus error signal Sfe, and the focus error signal Sfe from the RF amplifier 3 is passed through as it is (Step S16). Accordingly, after that, in a case where the focus error signal Sfe3 (refer to FIG. 3) corresponding to the 0 order light to be optimally beam-condensed to the optical disk 1, which is the DVD, is detected (Step S17). Namely the level FE of the focus error signal Sfe3 is compared with the predetermined threshold value TH. Then, if the focus error signal Sfe3 corresponding to the DVD is detected (Step S17; YES), the appropriate focus error signal Sfe3 is inputted to the servo IC. The focus-in action is carried out (Step S18), the focus servo control is carried out, and the process is ended.

On the other hand, at the step S12, in a case that the parameter S is not "1" (Step S12, NO), the optical disk 1 is the CD. Thus, in order to carry out the focus-in action by use of the focus error signal Sfe1 (refer to FIG. 3) corresponding to the +1 order light, the operation is shifted to the step S18. The replacement focus error signal Sfeb in this case is a replacement focus error signal shown by a symbol Sfeb2 in FIG. 3.

The focus drive signal Sfd at this time starts the focus servo control action at a different level as shown in FIG. 3, since the focus-in action of the optical pickup 2 is carried out at a different position between the CD and the DVD.

As explained above, according to the reproducing apparatus $S_1$ of the first embodiment, the focus servo control is carried out by extracting only the focus error signal Sfe corresponding to the type of the optical disk 1 to be reproduced, among a plurality of detected focus error signals Sfe. Thus, the focus serve control is not carried out by the focus error signal Sfe that does not correspond to the type of the optical disk 1. As a result, it is possible to carry out the correct focus servo control.

Further, only one focus error signal Sfe is extracted, and the servo IC 12 is controlled. Thus, for the optical pickup 2 in which a plurality of focus error signals Sfe are generated, it is possible to use the servo IC 12 having a capability of processing only one focus error signal.

As a result, it is possible to use the conventional servo IC 12, which is capable of processing only one focus error signal, for the bifocal lens.

Since the circuit of the reproducing apparatus $S_1$ can be commonly used in judging the optical disk 1, it is possible to make a whole configuration of the reproducing apparatus $S_1$ simplified.

(II) Second Embodiment

The second embodiment is explained with reference to FIGS. 5 and 6.

In the above mentioned first embodiment, in a process of detecting the focus error signal Sfe for the focus-in action after the type judgment of the optical disk 1 (a process of moving up the bifocal lens), in a case that the optical disk 1 is the DVD, the focus error signal Sfe1 is generated. Then, for a period while the Sfe2 is generated (for example, for 40 msec), by replacing the replacement focus error signal Sfeb1 by the standard voltage Vr, only the focus error signal Sfe3 corresponding to the 0 order light is inputted to the servo IC 12. On the other hand, in the second embodiment, for each of the periods while the focus error signals Sfe1 and Sfe2 are generated respectively, in a case that the optical disk 1 is the DVD, the replacement focus error signal Sfeb1 is replaced by the standard voltage Vr.

Since the hardware configuration of the reproducing apparatus of the second embodiment is the same as that of the reproducing apparatus $S_1$ of the first embodiment in FIG. 1, the explanations thereof are omitted.

Next, an actual operation is explained with reference to the flow chart in FIG. 5 and the timing chart in FIG. 6. In FIGS. 5 and 6, the same operations and wave forms as those in FIGS. 2 and 3 carry the same reference numerals and the detailed explanations thereof are omitted.

Figure 5:
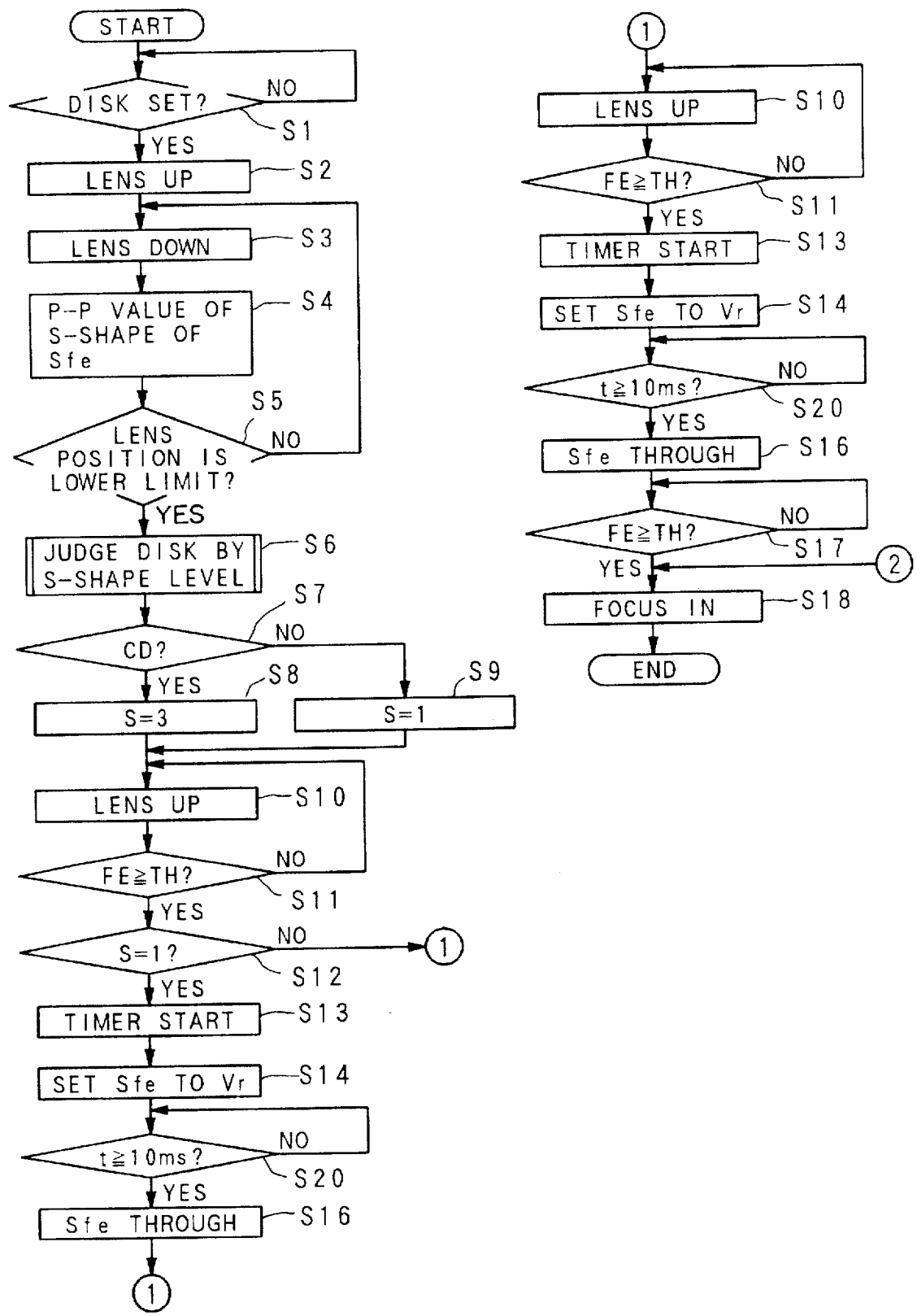
FIG. 5 is a flow chart showing an operation of a reproducing apparatus according to a second embodiment.

As shown in FIG. 5, in the reproducing apparatus of the second embodiment, at first, the operations at the steps S1 to S14 in FIG. 2 are carried out, and the optical disk 1 is judged. In a case that the optical disk 1 is the DVD, the timer 10 is started at a timing when the focus error signal Sfe1 is detected (Step S13), and the replacement control signal Se becomes in the "H" level on the basis of the count signal Sd. When the replacement control signal Se becomes in the "H" level, the switch SW1 is switched to the side of the standard voltage Vr by the control signal from the judging circuit 11. The replacement focus error signal Sfeb1 is replaced by the standard voltage Vr (0 V level in a case shown in FIG. 6), for example, for 10 msec that is longer than a width of the focus error signal Sfe1 as shown by a symbol Y of FIG. 6 (Step S14). A time period during which this switch SW1 is switched to the side of the standard voltage Vr is a time period during which only the focus error signal Sfe1 (refer to FIG. 6) is detected corresponding to the moving speed of the bifocal lens. Then, it is judged whether or not 10 msec has elapsed (Step S20). If it has not elapsed (Step S20 ; NO), the operation is waited as it is. If 10 msec has elapsed (Step S20 ; YES), the switch SW1 is switched again to the side of the focus error signal Sfe, and the focus error signal Sfe from the RF amplifier 3 is passed through as it is (Step S16).

Figure 6:
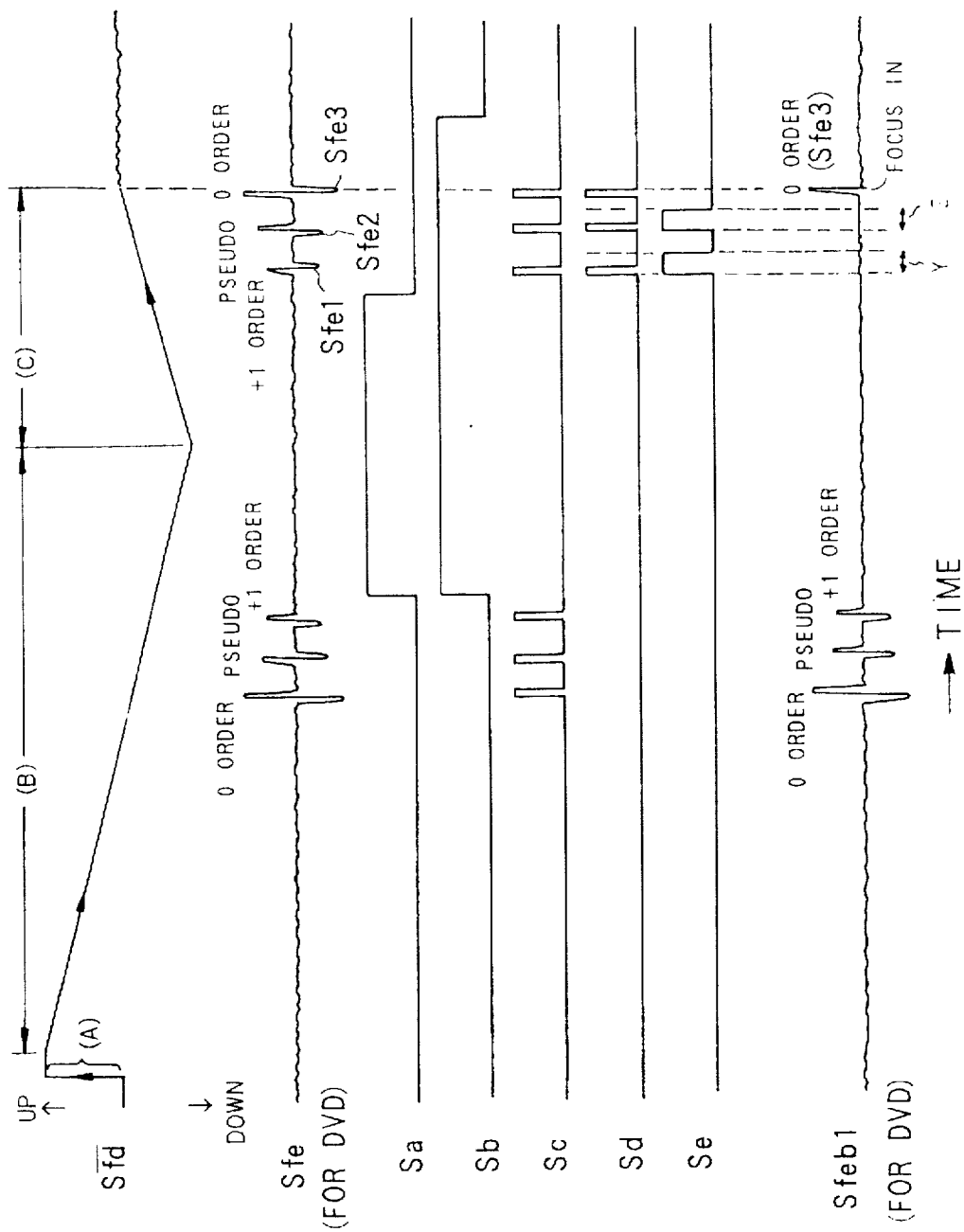
FIG. 6 is a timing chart showing the operation of the reproducing apparatus according to the second embodiment.

Next, the bifocal lens is continuously moved up, and the steps S10 to S16 and S20 in FIG. 5 are repeated for the focus error signal Sfe2 (refer to FIG. 6). Accordingly, even while the focus error signal Sfe2 is detected, the switch SW1 is switched to the side of the standard voltage Vr, and the replacement focus error signal Sfeb1 is replaced by the standard voltage Vr, for 10 msec as shown by a symbol Z in FIG. 6 (Step S14, S20 and S16).

By the two switching actions of the switch SW1 as mentioned above, in a case where the focus error signal Sfe3 (refer to FIG. 6) corresponding to the 0 order light to be optimally beam-condensed to the optical disk 1, which is the DVD, is detected after the focus error signal Sfe2 (Step S17 ; YES), the appropriate focus error signal Sfe3 is inputted to the servo IC. The focus-in action is carried out (Step S18), the focus servo control is carried out, and the process is ended.

In a case that the optical disk 1 is the CD, the switching action of the switch SW1 is not carried out. Similarly to the first embodiment, the focus-in action is carried out by use of the focus error signal Sfe1 detected firstly in the moving up process of the optical pickup, and the focus control is carried out.

Although the example in which the standard voltage Vr is 0 V is explained in this embodiment, it is not limited to this example. For example, in a case that a power supply voltage of the servo circuit is designed as 5 V, a central voltage of 2.5 V may be designed as the standard voltage Vr. Further, it is allowable to determine, by an experiment, a voltage at which the operation becomes stable, to thereby use this voltage as the standard voltage Vr.

In a case of the above explained reproducing apparatus of the second embodiment, it is possible to obtain the advantageous effect similar to that of the first embodiment.

(III) Third Embodiment

The third embodiment is explained with reference to FIGS. 7 to 9.

In the first and second embodiments, in a case that the focus error signal Sfe which does not correspond to the type of the judged optical disk 1 is detected, the replacement focus error signal Sfeb is replaced by the standard voltage Vr for that period, and only the focus error signal Sfe corresponding to the type of the appropriate optical disk 1 is inputted to the servo IC. On the other hand, in the third embodiment, by using a fact that an order of the focus error signal Sfe detected in the process of detecting the focus error signal Sfe for the focus-in action is known in advance, the appropriate detected the focus error signal Sfe is counted, and when the focus error signal Sfe corresponding to the type of the optical disk 1 is detected, the focus-in action is carried out.

At first, a configuration of a reproducing apparatus $S_2$ of the third embodiment is explained with reference to FIG. 7. In the reproducing apparatus $S_2$ shown in FIG. 7, the same constitutional elements as those in the reproducing apparatus $S_1$ of the first embodiment shown in FIG. 1 carry the same reference numerals and the detailed explanations thereof are omitted.

Figure 7:
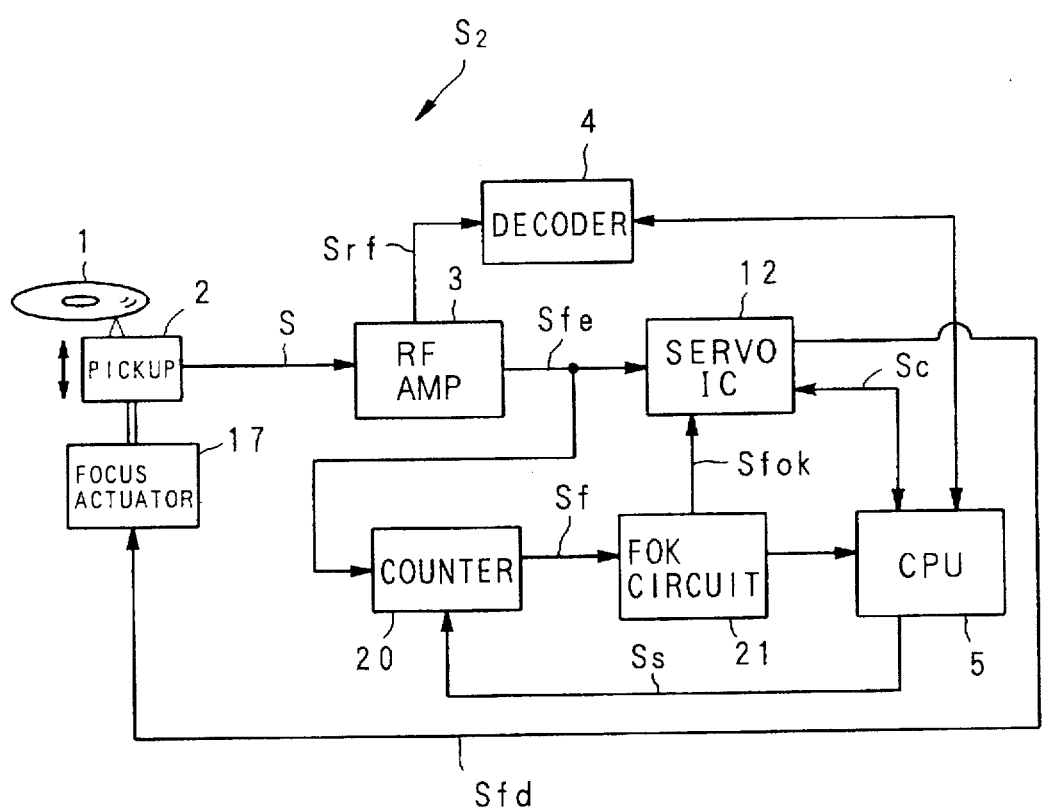
FIG. 7 is a block diagram showing a configuration of a reproducing apparatus according to a third embodiment.

As shown in FIG. 7, the reproducing apparatus $S_2$ of the third embodiment is provided with, in order to reproduce the optical disk 1, the optical pickup 2 including the bifocal lens, the RF amplifier 3, the decoder 4, the CPU 5, the servo IC 12 and the focus actuator 17, and further provided with a counter 20 as a counting means for counting the focus error signal Sfe outputted from the RF amplifier 3, and a FOK circuit 21 for outputting a FOK signal Sfok to the servo IC 12, on the basis of a count signal Sf from the counter 20. In the above mentioned configuration, in the servo IC 12, the focus-in action is carried out by utilizing the focus error signal Sfe at a timing when the FOK signal Sfok is inputted, and the focus servo control is carried out. An initial value S in the counter 20 is outputted from the CPU 5 as a set signal Ss, on the basis of a judgment result of the type of the optical disk 1, and inputted to the counter 20.

Next, an operation of the reproducing apparatus $S_2$ is explained with reference to the flow chart shown in FIG. 8 and the timing chart shown in FIG. 9.

At first, whether or not the optical disk 1 is set in the reproducing apparatus $S_2$ is detected by a detecting device that is not shown in FIG. 7 (Step S30). In a case that it is not set (Step S30 ; NO), the operation is waited as it is. In a case that it is set (Step S30 ; YES), the focus drive signal Sfd for moving down the bifocal lens is outputted from the servo IC 12 (refer to a symbol (A) of FIG. 9). Then, the bifocal lens is moved down to a predetermined position in a short time. The predetermined position in this case is set such that, even if the optical disk 1 is either one of the CD or the DVD, the position is sufficiently long with respect to the focal distances for both of the two light beams L in a movable range of the optical pickup 2 and that the predetermined position is located in a spaced direction from the information record surface of the optical disk (Step S31).

Figure 9:
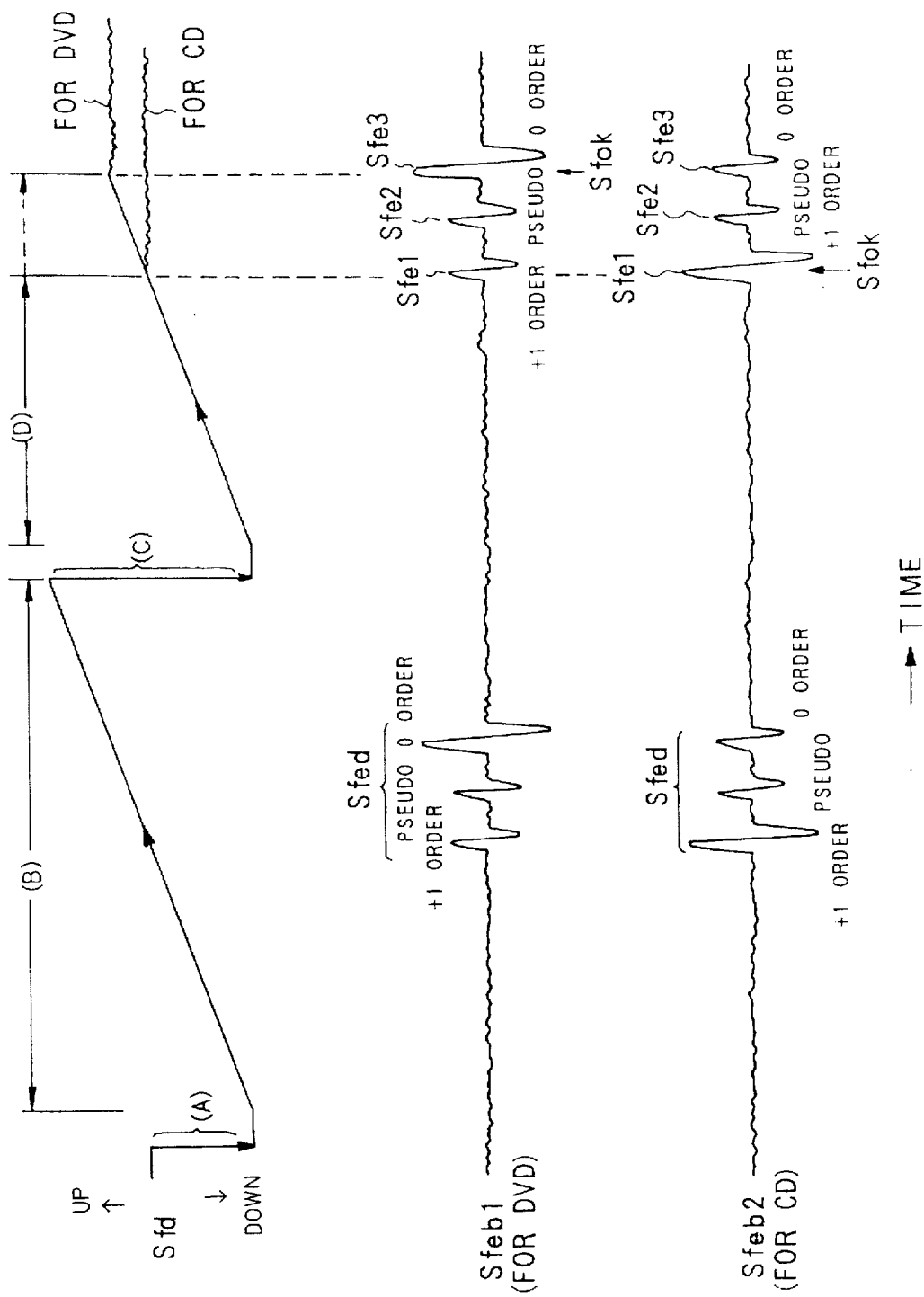
FIG. 9 is a timing chart showing the operation of the reproducing apparatus according to the third embodiment.

When the bifocal lens is moved down to the predetermined position (Step S31), the focus drive signal Sfd is outputted in order to move up the bifocal lens at a predetermined speed (Step S32, and refer to a symbol (B) of FIG. 9). The focus error signal Sfe detected in the course of the moving up action is read sequentially (Step S33). After that, it is judged whether or not a position of the bifocal lens after moving up is an upper limit (Step S34). In a case that the position is not the upper limit (Step S34 ; NO), the operation is returned to the step S32 in order to continue the moving up action as it is. In a case when the position becomes the upper limit (Step S34 ; YES), on the basis of the three focus error signals Sfed detected in the course of the moving up action until that time, it is judged whether the optical disk 1 is the CD or the DVD (Step S6). Incidentally, in FIG. 9, in a case that the optical disk 1 is the DVD, a series of the focus error signals Sfe have wave forms as shown by a symbol Sfeb1 in FIG. 9. In a case that the optical disk 1 is the CD, they have wave forms as shown by a symbol Sfeb2 in FIG. 9. Since a method of judging the optical disk is similar to that of the first embodiment, the detailed explanations thereof are omitted.

The type of the optical disk 1 is judged by using the focus error signal Sfed (refer to FIG. 9) (Steps S6 and S35). In a case that it is the CD (Step S35 ; YES), an initial value S is set to "1" (Step S36). In a case that it is the DVD (Step S35 ; NO), the initial value S is set to "3" (Step S37). Again, the bifocal lens is moved down to the predetermined position in a short time (Step S38, and refer to a symbol (C) of FIG. 9). Each initial value S set in the step S36 or S37 is outputted as the set value signal Ss from the CPU 5 to the counter 20.

After the initial value S is set to "1" or "3" (Steps S36 or S37), and the bifocal lens is moved down (Step S38), the focus drive signal Sfd is outputted for moving up the bifocal lens at a predetermined speed (Step S39, and refer to a symbol (D) of FIG. 9). Then, when the bifocal lens is moved up (Step S39), it is judged whether or not the first focus error signal Sfe1 (refer to a symbol Sfe1 of FIG. 9) is detected (Step S40). Namely, the level FE of the focus error signal Sfe1 is compared with the predetermined threshold value TH. In a case that the first focus error signal Sfe1 is not detected (Step S40 ; NO), the moving up action is continued until detected (Step S39). In a case that the focus error signal Sfe1 is detected (Step S40 ; YES), the count value is subtracted by "1" in the counter 20 (Step S41). Then, it is judged whether or not the count value becomes "0" (Step S42).

In this case, in a case that the count value becomes "0" (Step S42 ; YES), it is found that the initial value S was "1" at the step S36, and thereby the optical disk 1 is supposed to be the CD (in FIG. 9, the corresponding focus error signal is the focus error signal Sfeb2). Thus, since the focus error signal Sfe1 is the focus error signal Sfe corresponding to the +1 order light, in order to carry out the focus-in action by the appropriate focus error signal Sfe1, the FOK signal Sfok is outputted from the FOK circuit 21 to the servo IC 12 (Step S44), and the moving up action of the bifocal lens is stopped (Step S45). After that, the focus-in action is carried out by using the focus error signal Sfe1 (Step S46), the focus servo control is carried out, and the process is ended.

In a case that the count value is not "0" at the step S42 (NO), the operation is returned to the step S39. Then, while the bifocal lens is moved up, until the count value becomes "0", the subtracting action of the appropriate count value is repeated. In this case, it is found that the initial value S was "3" (Step S37), and thereby the optical disk 1 is supposed to be the DVD (in FIG. 9, the corresponding focus error signal is the focus error signal Sfeb1). Thus, since the focus error signal Sfe3 is the focus error signal Sfe corresponding to the 0 order light, in order to carry out the focus-in action by the appropriate focus error signal Sfe3, the FOK signal Sfok is outputted from the FOK circuit 21 to the servo IC 12 (Step S44), and the moving up action of the bifocal lens is stopped (Step S45). After that, the focus-in action is carried out by using the focus error signal Sfe3 (Step S46), the focus servo control is carried out, and the process is ended. Since the FOK signal Sfok is not outputted in response to the focus error signal Sfe1 or Sfe2 at this time, the focus-in action is not carried out by the focus error signal Sfe1 or Sfe2.

In the third embodiment, kin the process of detecting the focus error signal Sfe for the focus-in action after the type judgment of the optical disk 1, the focus error signal Sfe is detected by once moving down the bifocal lens (refer to the symbol (C) of FIG. 9) and then moving up (refer to the symbol (D) of FIG. 9). However, the detecting way is not limited to this way. That is, the focus error signal Sfe may be detected while moving down the bifocal lens from its current position after the type judgment of the optical disk 1. In this case, at the steps S36 and S37, in a case that the optical disk 1 is the DVD, the initial value S is set to "1", and in a case that the optical disk 1 is the CD, the initial value S is set to "3". The disk type is judged by moving down the lens at the step S31 and then moving up. However, of course, it is possible to carry out the focus-in action as in this embodiment, after the bifocal lens is once moved up as in the first and second embodiments and then the type is judged at the moving down process.

The focus drive signal Sfd in the third embodiment starts the focus servo control action at a different level as shown in FIG. 9, since the focus-in action of the optical pickup 2 is carried out at a different position between the CD and the DVD.

As explained above, according to the reproducing apparatus $S_2$ of the third embodiment, since the order of the focus error signal Sfe detected in the process of detecting the focus error signal Sfe for the focus-in action is known in advance, the focus servo control can be carried out by utilizing the focus error signal Sfe corresponding to the type of the judged optical disk 1, among a plurality of detected focus error signals Sfe. Therefore, the focus serve control is not carried out by the focus error signal Sfe that does not correspond to the type of the optical disk 1. As a result, it is possible to carry out the correct focus servo control.

Further, only one focus error signal Sfe is extracted, and the servo IC 12 is controlled. Thus, for the optical pickup 2 in which a plurality of focus error signals Sfe are generated, it is possible to use the servo IC 12 having a capability of processing only one focus error signal.

As a result, it is possible to use the conventional servo IC 12, which is capable of processing only one focus error signal, for the bifocal lens.

Furthermore, since it is not necessary to replace the focus error signal Sfe to another signal, it is possible to extract the focus error signal Sfe by use of a relatively simplified construction.

Since the circuit of the reproducing apparatus $S_2$ can be commonly used in judging the optical disk 1, it is possible to make a whole configuration of the reproducing apparatus $S_2$ simplified.

(IV) Fourth Embodiment

The fourth embodiment is explained with reference to FIGS. 10 to 12.

In the fourth embodiment, a moving direction of the bifocal lens in a process of detecting the focus error signal Sfe for the focus-in action is inverted on the basis of a judged result of the optical disk 1. Then, the focus-in action is carried out by using the firstly detected focus error signal Sfe.

At first, a configuration of a reproducing apparatus $S_3$ of the fourth embodiment is explained with reference to FIG. 10. In the reproducing apparatus $S_3$ shown in FIG. 10, the same constitutional elements as those in the reproducing apparatus $S_1$ of the first embodiment shown in FIG. 1 carry the same reference numerals and the detailed explanations thereof are omitted.

Figure 10:
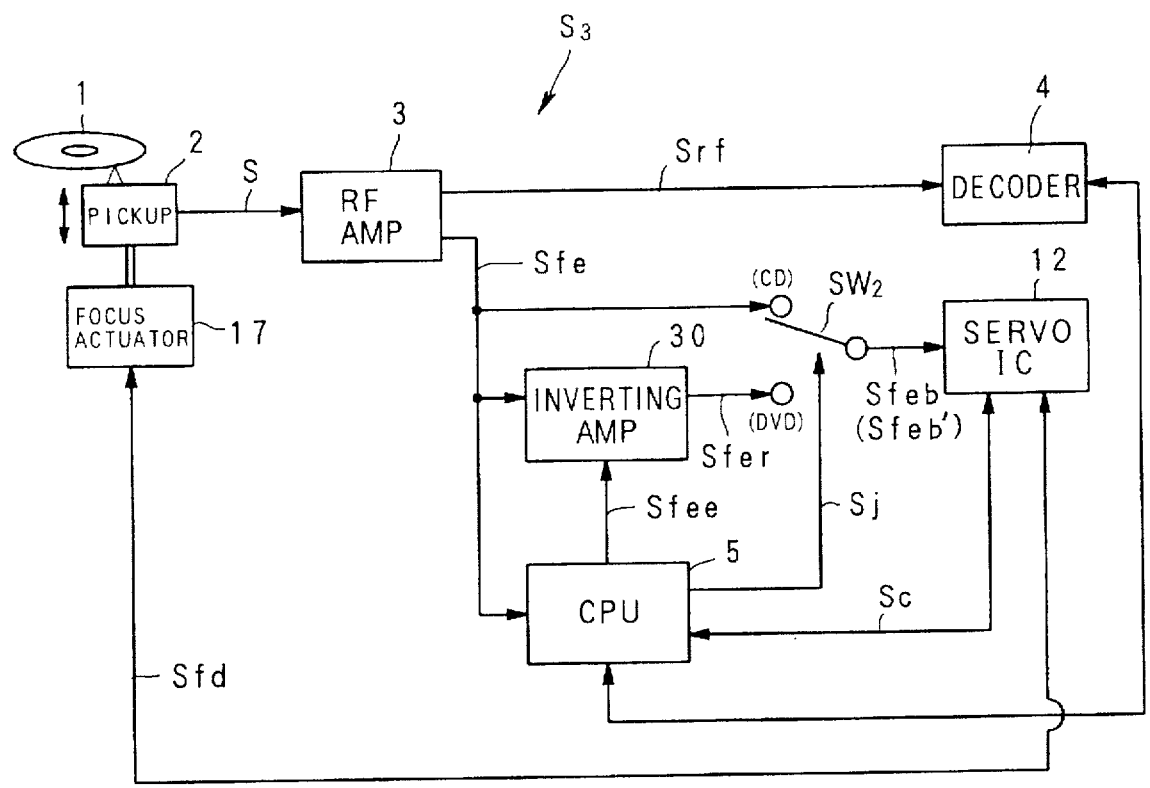
FIG. 10 is a block diagram showing a configuration of a reproducing apparatus according to a fourth embodiment.

As shown in FIG. 10, the reproducing apparatus $S_3$ of the fourth embodiment is provided with, in order to reproduce the optical disk 1, the optical pickup 2 including the bifocal lens, the RF amplifier 3, the decoder 4, the CPU 5, the servo IC 12 and the focus actuator 17, and further provided with an inverting amplifier 30 for inverting the focus error signal Sfe outputted from the RF amplifier 3 on the basis of an inversion signal Sfee from the CPU 5 to thereby output as an inversion focus error signal Sfer to a switch SW2 described later, and the switch SW2 for switching the focus error signal Sfe and the inversion focus error signal Sfer on the basis of the judgment signal Sj from the CPU 5 to thereby output the focus error signal Sfeb.

Next, an operation of the reproducing apparatus $S_3$ is explained with reference to the flow chart shown in FIG. 11 and the timing chart shown in FIG. 12.

Figure 8:
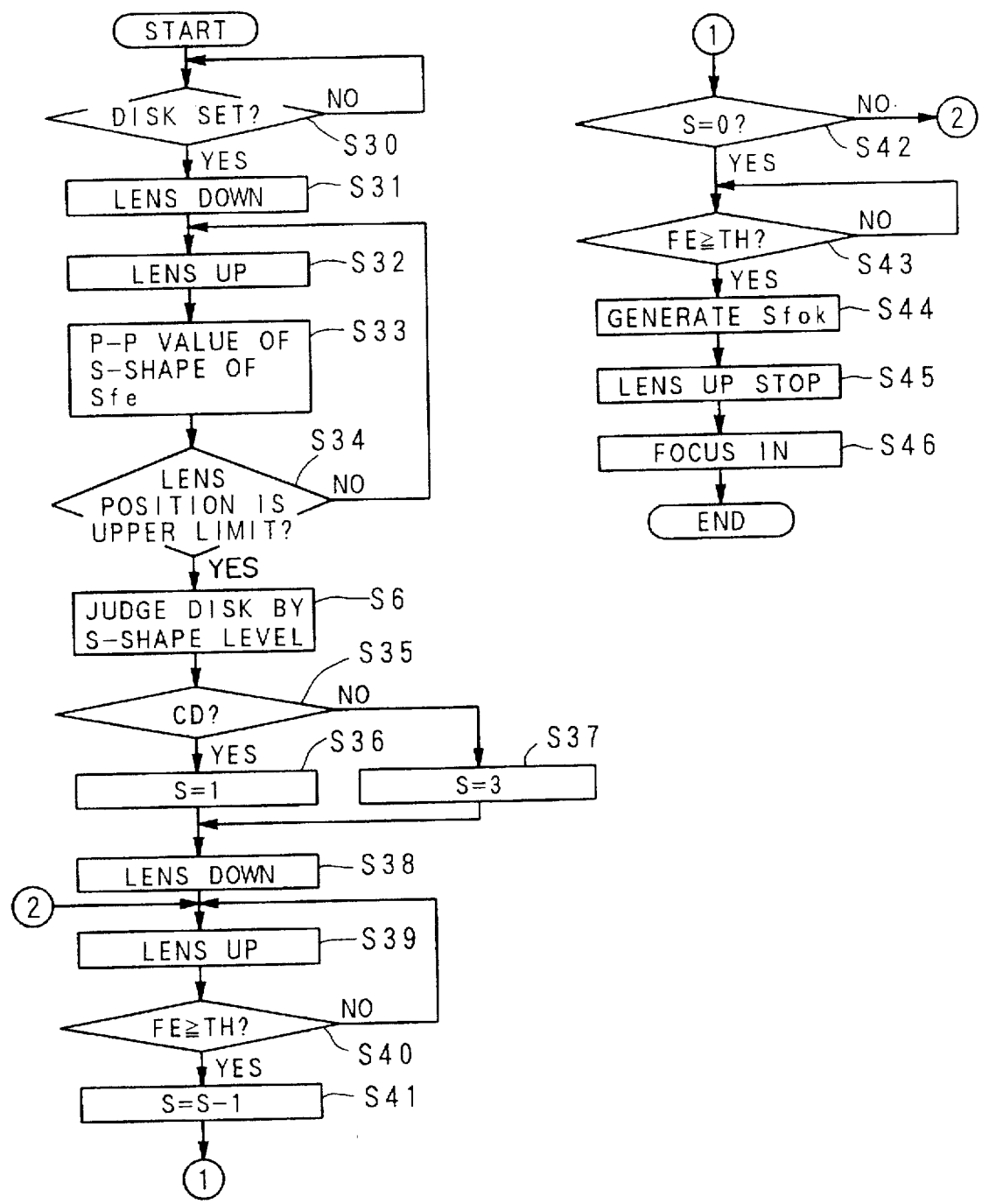
FIG. 8 is a flow chart showing an operation of the reproducing apparatus according to the third embodiment.
Figure 11:
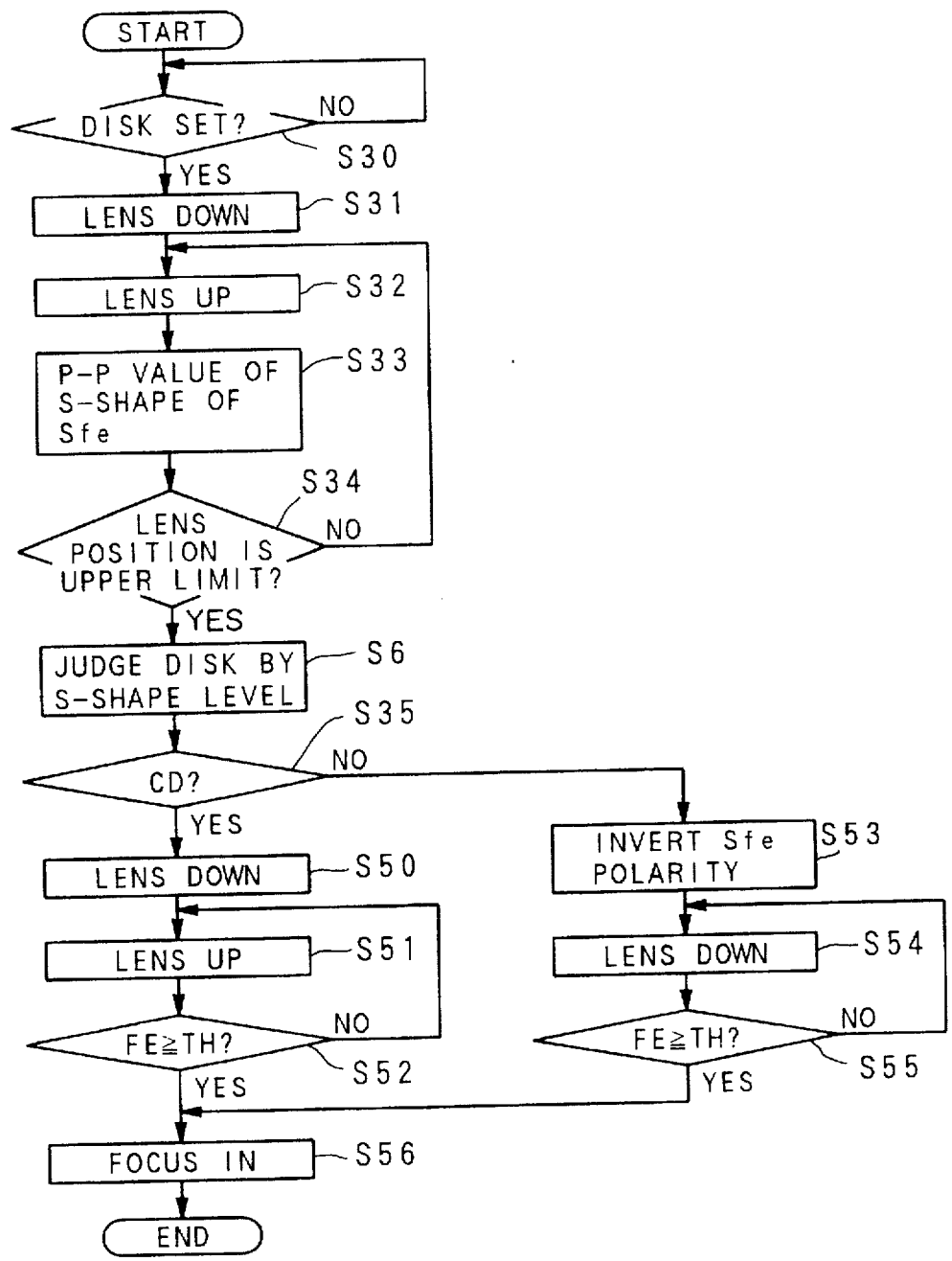
FIG. 11 is a flow chart showing an operation of the reproducing apparatus according to the fourth embodiment.

As shown in FIG. 11, in the reproducing apparatus $S_3$, the operations similar to those at the steps S30 to S35 and S6 in the flow chart shown in FIG. 8 are carried out at first, and the type of the optical disk 1 is judged.

The type of the optical disk 1 is judged by using the focus error signal Sfed (refer to FIG. 12A). In a case that it is the CD (Step S35 ; YES), the focus drive signal Sfd for moving down the bifocal lens in a short time is outputted (refer to a symbol (C) of FIG. 12A), and thereby the bifocal lens is moved down to a predetermined position (Step S50). When the bifocal lens is moved down to the predetermined position in the short time, the focus drive signal Sfd for moving up the bifocal lens at a predetermined speed is outputted (refer to a symbol (D) of FIG. 12A), and thereby the bifocal lens is moved up (Step S51). Then, it is judged whether or not the first focus error signal Sfe (refer to FIG. 12A) is detected (Step S52). Namely the level FE of the focus error signal Sfe is compared with the predetermined threshold value TH. When the first focus error signal Sfe is not detected (Step S52 ; NO), the moving up action is continued until it is detected (Step S51). When it is detected (Step S52 ; YES), the appropriate first focus error signal Sfe is the focus error signal due to the +1 order light corresponding to the CD. Thus, the focus-in action is carried out by utilizing this signal (Step S56), the focus control action is carried out, and the process is ended.

In the operation in a case that this optical disk 1 is the CD, since it is judged that the optical disk 1 is the CD, and since the focus error signal Sfe obtained firstly in the process of moving up the bifocal lens is the focus error signal corresponding to the +1 order light (set so as to be optimally beam-condensed on the CD), the focus-in action is carried out by the appropriate focus error signal Sfe.

On the other hand, in a case that the optical disk 1 is the DVD at the step S35 (Step S35 ; NO), as shown in FIG. 12B, the inversion signal Sfer is outputted to the inverting amplifier 30 (Step S53), and also the judgment signal Sj is outputted to the switch SW2, and thereby the switch SW2 is switched to a side of the inversion focus error signal Sfer. At the same timing as the above mentioned switching action, the focus drive signal Sfd for moving down the bifocal lens at a predetermined speed (refer to a symbol (E) of FIG. 12B) is outputted, and thereby the bifocal lens is moved down (Step S54). Then, it is judged whether or not the first focus error signal Sfe' (refer to of FIG. 12B) is detected (Step S55). Namely, the level FE of the focus error signal Sfe' is compared with the predetermined threshold value TH. When the first focus error signal Sfe' is not detected (Step S55 ; NO), the moving down action is continued until detected (Step S54). When it is detected (Step S55 ; YES), the appropriate first focus error signal Sfe' is the focus error signal due to the 0 order light corresponding to the DVD. Thus, the focus-in action is carried out by utilizing this signal (Step S56), the focus control action is carried out, and the process is ended.

In the operation in a case that this optical disk 1 is the DVD, since it is judged that the optical disk 1 is the DVD, and since the focus error signal Sfe' obtained firstly in the process of moving down the bifocal lens is the focus error signal corresponding to the 0 order light (set so as to be optimally beam-condensed on the DVD), the focus-in action is carried out by the appropriate focus error signal Sfe.

The reason why the focus error signal Sfe is inverted by the inverting amplifier 30 in a case that the optical disk 1 is the DVD is explained below. That is, in a case of using as the servo IC 12 the conventional IC capable of processing only one focus error signal, at a time of carrying out the focus-in action, there may be a case that the focus-in action can not be carried out without the focus error signal Sfe which is temporally shifted from [+] to [−]. However, when the bifocal lens according to this embodiment is moved down, the focus error signal Sfe is detected as a signal shifted from [−] to [+]. Thus, it is necessary to polarity-invert this signal into the inversion focus error signal Sfer. As a result, in a case of using the servo IC that does not receive a constraint of a polarity in the focus-in action, it is not necessary to invert the focus error signal Sfe.

The focus drive signal Sfd in the fourth embodiment starts the focus servo control action at a different level as shown in FIG. 12. since the focus-in action of the optical pickup 2 is carried out at a different position between the CD and the DVD.

As explained above, according to the reproducing apparatus S₃ of the fourth embodiment, the moving direction of the bifocal lens in the process of detecting the focus error signal Sfe for the focus-in action is inverted on the basis of the type of the judged optical disk 1, and the focus-in action is carried out by utilizing the focus error signal Sfe detected firstly in each of the cases. Thus, the focus servo control can be carried out by utilizing the focus error signal Sfe corresponding to the type of the judged optical disk 1, among a plurality of detected focus error signals Sfe. Therefore, the focus serve control is not carried out by the focus error signal Sfe that does not correspond to the type of the optical disk 1. As a result, it is possible to carry out the correct focus servo control.

Further, only one focus error signal Sfe is extracted, and the servo IC 12 is controlled. Thus, for the optical pickup 2 in which a plurality of focus error signals Sfe are generated, it is possible to use the servo IC 12 having a capability of processing only one focus error signal.

As a result, it is possible to use the conventional servo IC 12, which is capable of processing only one focus error signal, for the bifocal lens.

Furthermore, since it is not necessary to replace the focus error signal Sfe to another signal or to count the focus error signal Sfe, it is possible to extract the focus error signal Sfe by use of a relatively simplified construction.

Since the circuit of the reproducing apparatus S₃ can be commonly used in judging the optical disk 1, it is possible to make a whole configuration of the reproducing apparatus S₃ simplified.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A focus servo controlling method for carrying out a focus servo control when reproducing record information from one of a plurality of optical record mediums of various types, which distances from external surfaces thereof to information record surfaces thereof recorded with the record information are different from each other, said method comprising the steps of:

judging a type of an optical record medium to be reproduced;

irradiating an information record surface of said optical record medium with a plurality of light beams to be focused on different positions on one optical axis;

moving, so as to change a relative distance parallel to said one optical axis between an objective lens for prescribing focal points of said plurality of light beams respectively and said information record surface, said objective lens;

receiving a plurality of reflection lights of said plurality of light beams reflected from said information record surface respectively, associated with a change of said relative distance;

generating a plurality of focus error signals on the basis of each of said plurality of received reflection lights;

extracting one of the generated focus error signals, which corresponds to the type of the optical record medium judged by said judging step; and carrying out said focus servo control on the basis of the extracted focus error signal.

2. A method according to claim 1, wherein said extracting step comprises the step of replacing a focus error signal other than the focus error signal, which corresponds to the type of the optical record medium judged by said judging step, by a replacement signal having a predetermined constant voltage.

3. A method according to claim 1, wherein said extracting step comprises the steps of:

counting the generated focus error signals; and extracting one of the counted focus error signals, which corresponds to a count value set on the basis of the type of the optical record medium judged by said judging step.

4. A method according to claim 1, wherein said extracting step comprises the steps of:

inverting a moving direction of said objective lens in said moving step on the basis of the type of the optical record medium judged by said judging step; and extracting a focus error signal, which is firstly generated by said generating step in conjunction with a moving action of said objective lens in the inverted moving direction.

5. A method according to claim 1, wherein said judging step comprises the steps of:

pre-moving said objective lens prior to said focus servo control, and judging the type of said optical record medium by comparing levels of a plurality of focus error signals, which are generated by said generating step while pre-moving said objective lens, with a predetermined standard level.

6. A focus servo controlling apparatus for carrying out a focus servo control when reproducing record information from one of a plurality of optical record mediums of various types, which distances from external surfaces thereof to information record surfaces thereof recorded with the record information are different from each other, said apparatus comprising:

a judging means for judging a type of an optical record medium to be reproduced;

an irradiating means for irradiating an information record surface of said optical record medium with a plurality of light beams to be focused on different positions on one optical axis;

a moving means for moving, so as to change a relative distance parallel to said one optical axis between an objective lens for prescribing focal points of said plurality of light beams respectively and said information record surface, said objective lens;

a light-receiving means for receiving a plurality of reflection lights of said plurality of light beams reflected from said information record surface respectively, associated with a change of said relative distance;

a focus error signal generating means for generating a plurality of focus error signals on the basis of each of said plurality of received reflection lights;

an extracting means for extracting one of the generated focus error signals, which corresponds to the type of the optical record medium judged by said judging means; and a controller for carrying out said focus servo control on the basis of the extracted focus error signal.

7. A apparatus according to claim 6, wherein said extracting means comprises a replacing means for replacing a focus error signal other than the focus error signal, which corresponds to the type of the optical record medium judged by said judging means, by a replacement signal having a predetermined constant voltage.

8. A apparatus according to claim 6, wherein said extracting means comprises:

a counter for counting the generated focus error signals; and an extractor for extracting one of the counted focus error signals, which corresponds to a count value set on the basis of the type of the optical record medium judged by said judging means.

9. A apparatus according to claim 6, wherein said extracting means comprises:

an inverting means for inverting a moving direction of said objective lens by said moving means on the basis of the type of the optical record medium judged by said judging means; and an extractor for extracting a focus error signal, which is firstly generated by said generating means in conjunction with a moving action of said objective lens in the inverted moving direction.

10. A apparatus according to claim 6, wherein said judging means comprises:

a pre-moving means for pre-moving said objective lens prior to said focus servo control, and a comparing means for judging the type of said optical record medium by comparing levels of a plurality of focus error signals, which are generated by said generating means while pre-moving said objective lens, with a predetermined standard level.

* * * * *